United States Patent [19]

Musso

[11] Patent Number: 4,474,248

[45] Date of Patent: Oct. 2, 1984

[54] HYDRAULIC DEMOLISHING ROCK DRILL

[75] Inventor: Mario Musso, Cuneo, Italy

[73] Assignee: Giovanni Donadio, Caraglio, Italy; a part interest

[21] Appl. No.: 370,851

[22] Filed: Apr. 22, 1982

[30] Foreign Application Priority Data

Apr. 23, 1981 [IT] Italy .............................. 67554 A/81
Feb. 5, 1982 [IT] Italy .............................. 67134 A/82

[51] Int. Cl.[3] .............................................. B23Q 5/00
[52] U.S. Cl. ...................................... 173/17; 173/134
[58] Field of Search ....................... 173/13, 15, 16, 17, 173/134; 91/319, 276

[56] References Cited

U.S. PATENT DOCUMENTS 1,037,535 9/1912 Richards .............................. 173/17
3,661,216 5/1972 Yamanaka ............................ 173/17
4,018,135 4/1977 Lance .................................. 91/276
4,149,602 4/1979 James ................................. 173/134
4,231,434 11/1980 Justus ................................. 91/276
4,308,924 1/1982 Boguth ............................... 173/134

*Primary Examiner*—James M. Meister
*Assistant Examiner*—John L. Knoble
*Attorney, Agent, or Firm*—Fleit, Jacobson, Cohn & Price

[57] ABSTRACT

Hydraulic breaking down or demolishing rock drill in which there is a stroke only pressing the drill against the surface to be broken down or drilled. The result is a reduced hard work of the operator and a reduced wear of the drill parts. This drill has an axial chamber body made of different cylindrical sectors, in which is sliding a rammer having two cylindrical joint elements of different diameter: the upper having a groove while the lower has an annular band-like piston ring. An intermediate sector of the axial chamber is equipped with a distributing valve for the oil, controlling the various working phases. The drill body is equipped with various oil pipes joining the oil tank with the sectors of the axial chamber, or such sectors altogether. The drill is also equipped with a device regulating the impact frequency.

17 Claims, 4 Drawing Figures

HYDRAULIC DEMOLISHING ROCK DRILL

BACKGROUND OF THE INVENTION

1. Field of the Invention

The present invention is concerned with an improved hydraulic drill, more exactly a breaking down drill, as well as with breakers.

2. Description of the Prior Art

Demolishing and breaking works are today generally executed by means of drills, equipped with a double handle body, a rammer sliding in the body by means of a pneumatic stress in order to strike a breaking down apparatus extending from the lower end of the drill. Such drills are actuated by a compressed air source, generally supplied by a feeding plant. Furthermore, these apparatus are very noisy due to their structure and to the noise of the feeding plant, necessitating in addition heavy shieldings when actuated in town areas. In the past many efforts were concerned with the realization of hydraulic rock drills instead of pneumatic drills. The use of hydraulic rock drills giving the same performance as pneumatic drills is desirable for many reasons, as, for instance, the reduced power absorption, due to the greater intrinsic output of the hydraulic apparatus; their reduced noise, due to the absence of a strong expansion of compressed air; the improved life of internal components, which are lubricated by the hydraulic oil; the reduced total cost of the unit drill supply station due to the reduced installed power and to the absence of expensive anti-noise shieldings; and, finally, the use of the hydraulic drill actuated by a hydraulic plant of tractors, or similar equipment, such as road rollers.

Unfortunately, the hydraulic rock drills presently in use generally are not accepted due to the reason of the reduced elasticity of the hydraulic circuit with respect to the pneumatic; the consequence is a considerable hard work of the operator, on whose arms are continuously discharging the strong return shocks of the rammer, not damped by the elasticity of a pneumatic fluid.

A hydraulic rock drill reducing such fatigue of the operator and the wear of the parts of drill itself should be greatly desirable.

SUMMARY OF THE INVENTION

The present invention concerns an improved hydraulic rock drill, which improves the already known hydraulic drills and particularly characterized by the fact that the rammer of the drill strikes only when the bit is pressed against the surface to be broken down or drilled. In this way, the fatigue of the operator and the wear of the drill are drastically reduced, as they are experienced only when the drill is effectively actuated.

Such advantages and others resulting from the following specification are obtained by a hydraulic rock drill having a rammer sliding in an axial chamber of the drill itself, in order to strike an apparatus axially mounted on the drill. The rammer has a lower cylindrical element equipped with an annular cylindrical band like a slidable seal coupled piston in a sector of the axial chamber and an upper cylindrical element connected to the lower, having a circular groove. This element also is slidably seal coupled with the upper sector of the axial chamber. An oil distributing valve is housed in an intermediate sector of the axial chamber for distributing oil to the pipes provided in the drill and communicating with the different sectors of the axial chamber. The rock drill is equipped with starting and regulating devices for controlling the shock frequency of the rammer.

BRIEF DESCRIPTION OF THE DRAWINGS

A preferred realization of this invention will now be described, with reference to the enclosed drawings, in which.

DESCRIPTION OF THE PREFERRED EMBODIMENT

Figure 1:
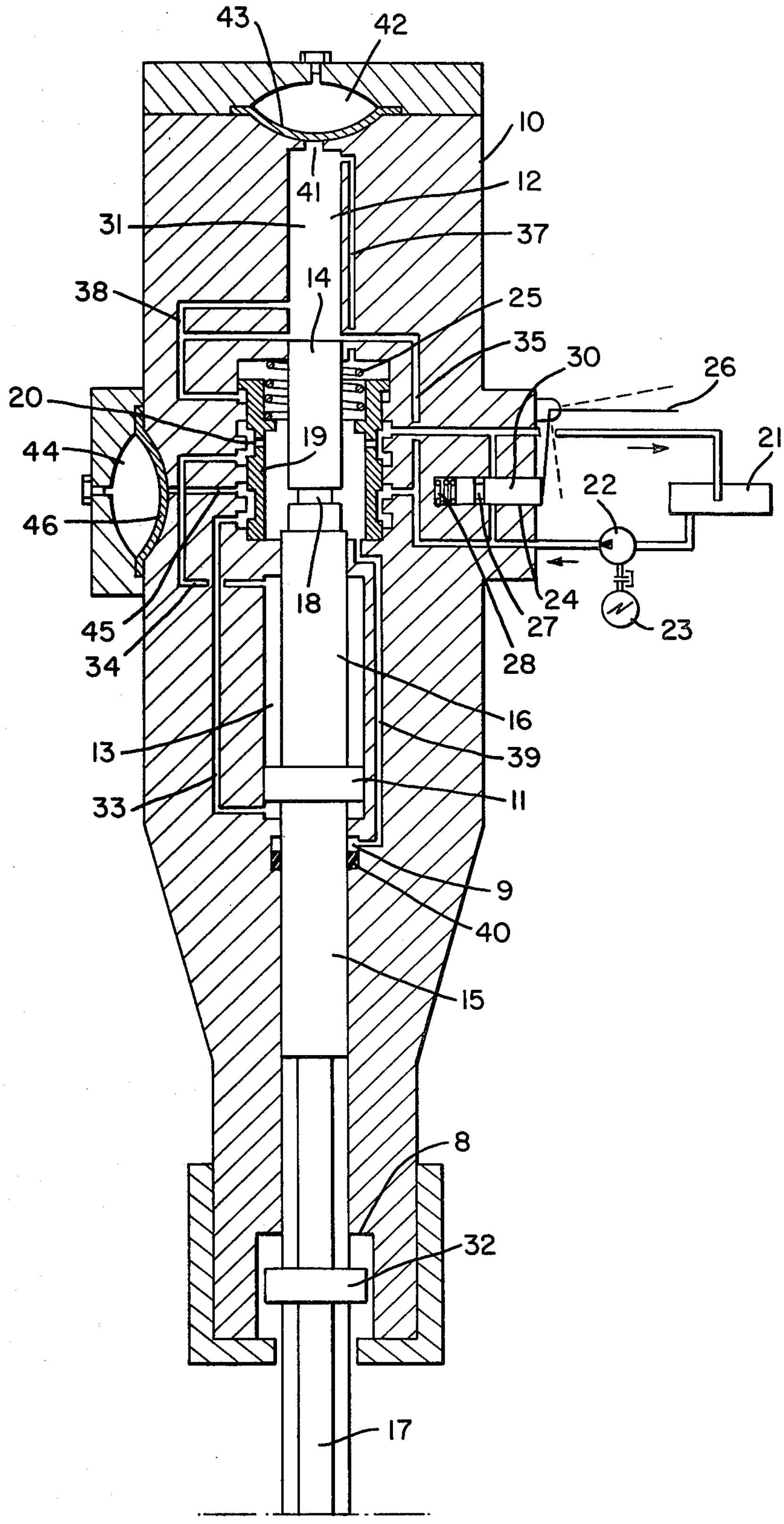
FIG. 1 is an axial sectional view of the hydraulic drill according to the invention showing the rammer at rest.

With reference to FIG. 1, a hydraulic drill, according to the present invention, has a body 10 with a long axial chamber 12, substantially constituted of five cylindrical coaxial sectors of different diameters, in which is sliding the rammer 16 in order to strike the bit 17. The sectors include, arranged in sequence, a lowermost sector, a chamber sector, an intermediate sector and an upper sector.

This rammer in its lower element 15 has an oversize diameter cylindrical annular band 11 sliding as a seal coupled piston ring in the chamber sector 13 of the chamber 12. The cylindrical upper element 14 of the rammer is seal coupled, sliding in the upper sector of the chamber and has a circular groove 18.

In the intermediate sector 20 of the axial chamber is provided a distributing valve 19, equipped with external annular projections to open and close the different inlet and outlet ports for oil coming from the tank 21 (schematic), fed by the pump 22, which is driven by engine 23. Inside the upper cavity of the distributing valve 19 is provided a helical spring 25, which can be elastically compressed against the head of the sector 20 of the axial chamber in the same distributing valve 19, as will become more clear subsequently. A starting or regulating device 24 is actuated by a driving lever 26 equipped with a button 30 having groove 27 and subjected to the elastic stress of the spring 28. A series of pipes or ducts for the passage of oil coming from the tank 21 are provided in the drill. They communicate with the various sectors of the axial chamber, as it will be further shown.

The base of the sector 20 of the axial chamber communicates, through a pipe or duct 39, with a blow-by recovery chamber 9, having a seal 40.

With reference to FIG. 1, the rammer of the hydraulic drill, according to the present invention, is at rest, that is, it is in contact with the bit 17 but is not moving. It has been said before, in fact, that one of the advantages according to the present invention, consists in the fact that there is no strike when the bit is not pressed against the surface to be drilled. At rest, the rammer is supported by the bit, without lifting and lowering to strike it.

This matter is clear when observing the flow of the fluid in this case. Oil, coming from the pump 22, rises in the duct 35 entering the compartment 31 of the axial chamber, which it fills. Then, through the duct 37, the oil flows to the inner part of the distributing valve 19 and, through its port, is returned to the tank 21.

A part of this oil, rising in the duct 35 can enter the low part of sector 20 of the axial chamber and from there, through duct 33, to the sector 13, providing a pressure on the lower surface of the piston 11. Such pressure is reduced to the minimum because this pressure on the lower face of the piston 11 is counterbalanced by that on its upper face, by the oil coming from the port of the distributing valve, through the duct 34.

In such a way, the rammer is stable, not submitted to rise or to descend in the axial chamber, in other words the bit of the apparatus is not struck.

Figure 2:
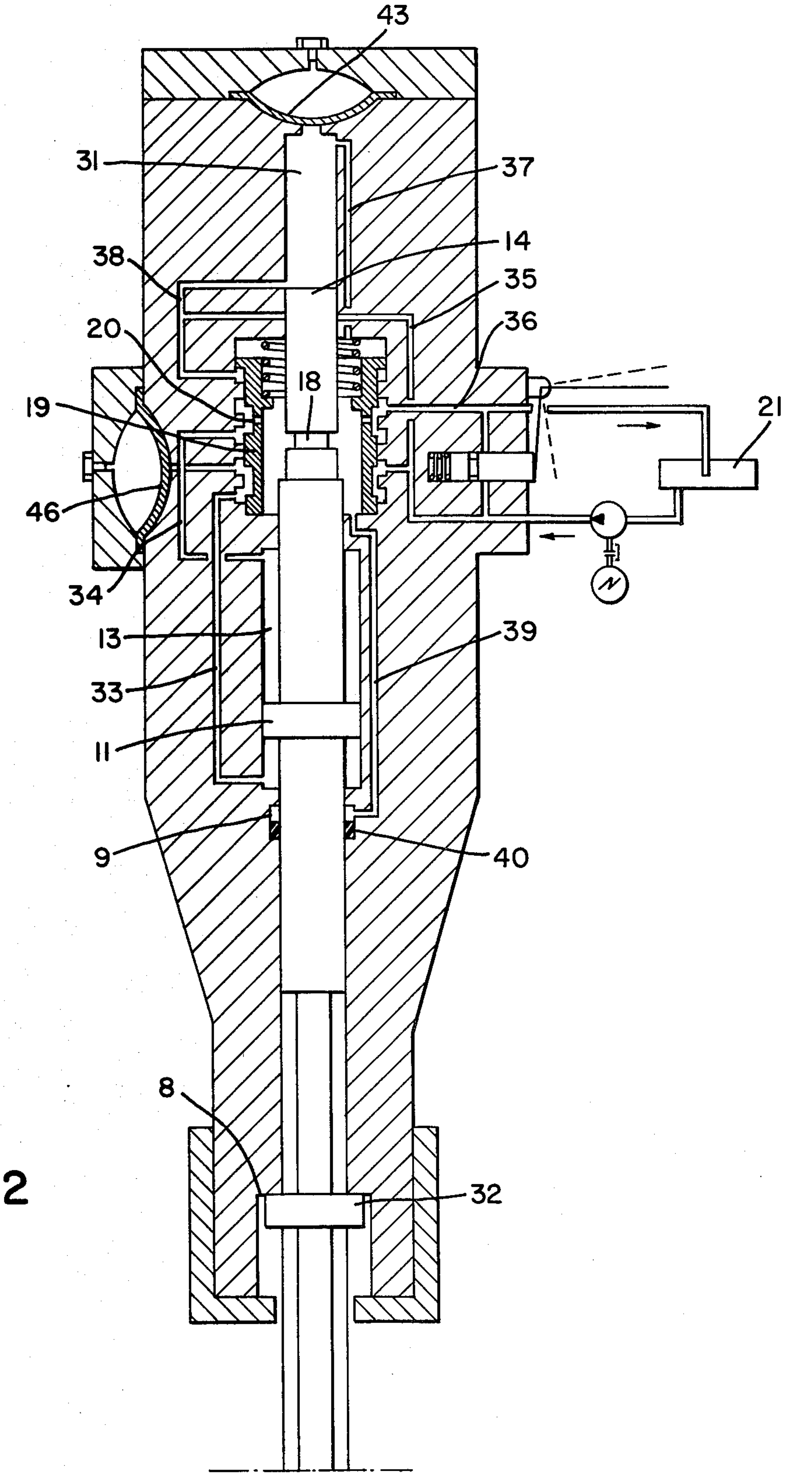
FIG. 2 is an axial sectional view of the drill showing the rammer in a partially raised position.

FIG. 2 shows the bit of the same apparatus supported on the surface to be drilled, pushing the core 32 of the bit against the lower surface 8 of the drill. Such movement raises the rammer in the axial chamber so that the upper element 14 of the rammer obstructs the port in sector 31 of the oil duct 35. When duct 35 is blocked, oil coming from the pump through the duct 35, cannot pass to the upper part 31 of the axial chamber, but only to the lower part of the sector 20. The oil flows through the external jacket of the distributing valve 19, to the duct 33 and then to the base of the sector 13 of the axial chamber. On the lower face of the piston 11 a considerable stress is present, due to the oil pressure and so the rammer lifts.

On the other hand, the fluid in the sector 13 of the axial chamber over the piston 11, is pressed through the duct 34 and then to the upper section of the sector 20 of this chamber. Through the external jacket of the distributing valve 19 and/or inside of it, the oil reaches the return duct 36 and flows to the tank.

Similarly the fluid in the sector 31 of the axial chamber is pressed by the rammer to flow through the duct 37 communicating with the inside of the distributing valve 19, and then out of the duct 36.

Figure 3:
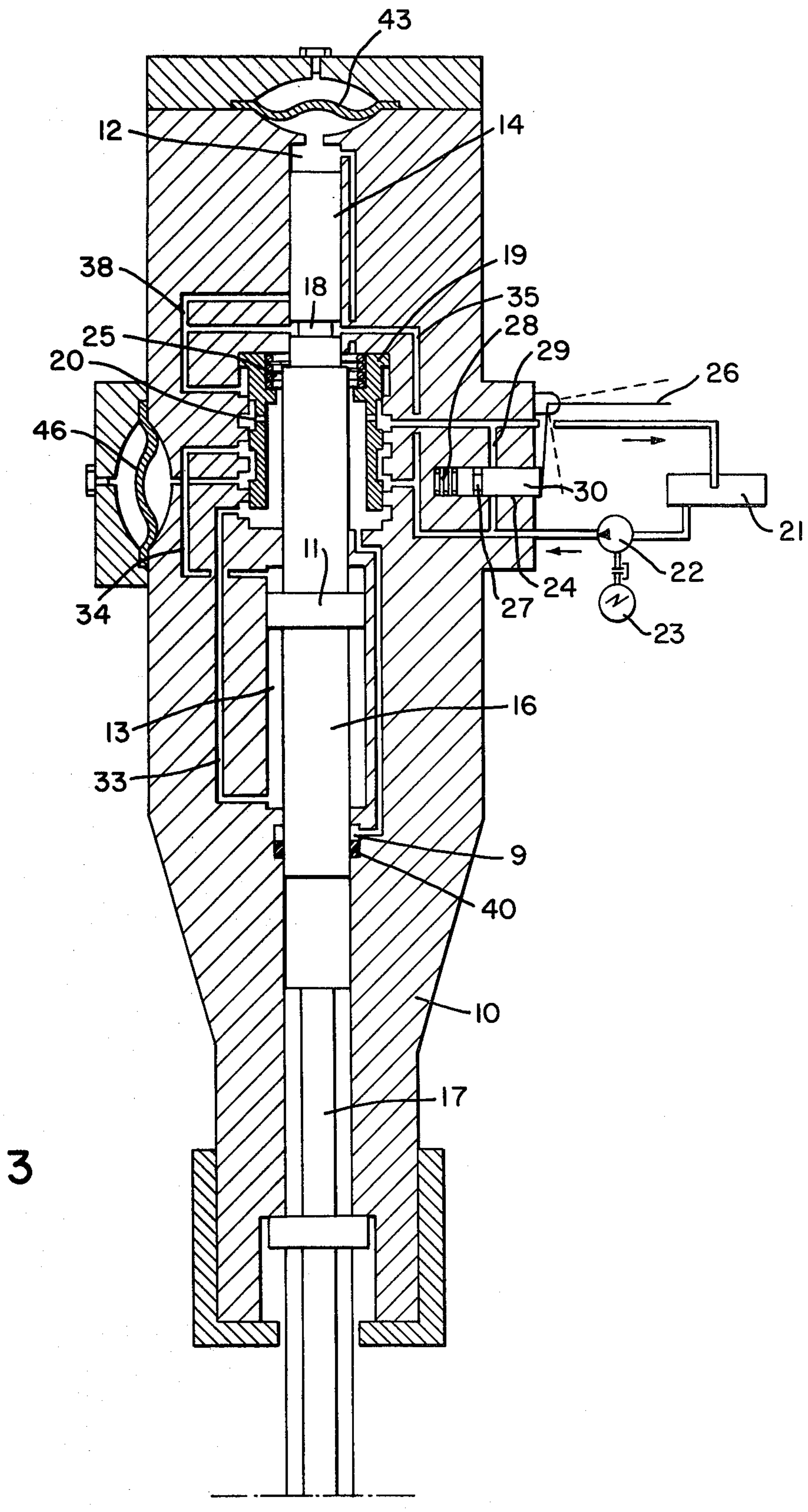
FIG. 3 is an axial sectional view of the drill showing the rammer in its uppermost position.

Consequently, the rammer lifts until the groove 18 provided in the upper element 14 of the rammer is aligned with the outlet of the duct 35 in the upper part 31 of the axial chamber, as shown in FIG. 3. Then, the oil flows through the groove 18 and the duct 38 in the upper part of the section 20 of the chamber thereby raising the distributing valve 19, having an upper edge sealed with such sector of the chamber.

As a consequence, the distributing valve is pressed against the head of the sector 20, in opposition to the elastic action of the spring 25. When the distributing valve is thus positioned, the ports of oil to the duct 33 are closed, while those to the duct 34 are opened. The flow of oil in the duct 34 is then reversed with respect to the situation of FIG. 2; the oil flow that was lifting in 34 is now descending; so the oil pressure is directed to the upper face of the piston 11, and the rammer is lowered to strike the bit 17.

At the end of the stroke, the bit 17 being pressed against the surface to be drilled, all the moving parts of the hydraulic drill, according to the present invention, will be as per FIG. 2; with the distributing valve 19 being on the base of the compartment 20 of the chamber. This fact is due to the oil, which can now flow to the upper part of the chamber through the duct 38, the port of which to the sector 31 is no longer obstructed. Without a stress to the raised position, the distributing valve 19 returns to the position of FIG. 2, reopening the ports for the fluid to the base of the sector 13 of the chamber, so that the oil pressure is again exerted on the lower surface of the piston 11, making the rammer to lift.

The cycles, according to FIGS. 2 and 3, are alternatively repeated as long as the core bit 32 is pressed against the surface 8 of the drill.

A considerable advantage of the present invention consists in the fact that the rammer acts on the bit as long as the bit has not yet drilled the surface being worked. Once the surface is drilled, without encountering any resistance to the shock of the bit, the apparatus immediately returns as in FIG. 1, eliminating strike, operator's fatigue and drill wear.

Another important result of the drill according to the present invention consists in the possibility of regulating the strike frequency of the rammer on the bit. The known drills at present have only the two open or closed positions, with regard to the hydraulic oil circuit; there is no intermediate regulation.

According to the drill of the present invention, it is possible to obtain such regulation acting, through the arm 26, on the button 30. In fact the groove 27 of the regulation device can face, completely or partially, the vertical duct 29, realizing a by-pass alternative oil circuit in respect of that of duct 35. So, the oil pressure in the main circuit is reduced, allowing a certain discharge of it directly to the tank by means of the by-pass 29, and reducing at the same moment the strike frequency of the drill on the bit.

Another advantage consists in improving the performance of drills having considerable dimensions, by means of a known membrane accumulator 42, externally and axially to the chamber 31, communicating through the internal duct 41. The membrane has the purpose of relieving dangerous pulsations in the flexible oil return pipes 69, illustrated in FIG. 4. The membrane 43 of the device is curved towards the compartment 31 when the bit 17 is at rest, as in FIG. 1, or supported, as in FIG. 2. In the case of the actuation of the bit 17, the membrane 43 will be curved away from the compartment 31, as in FIG. 3.

Another accumulator 44, through the duct 45, communicates with the distributing valve 19, in order to increase the strike power of the drill 14, due to the oil present in the duct 45. This last is admitted when the rammer is lifting and vice versa is discharging when the rammer descends, together with the opposite bendings of the membrane 46.

Figure 4:
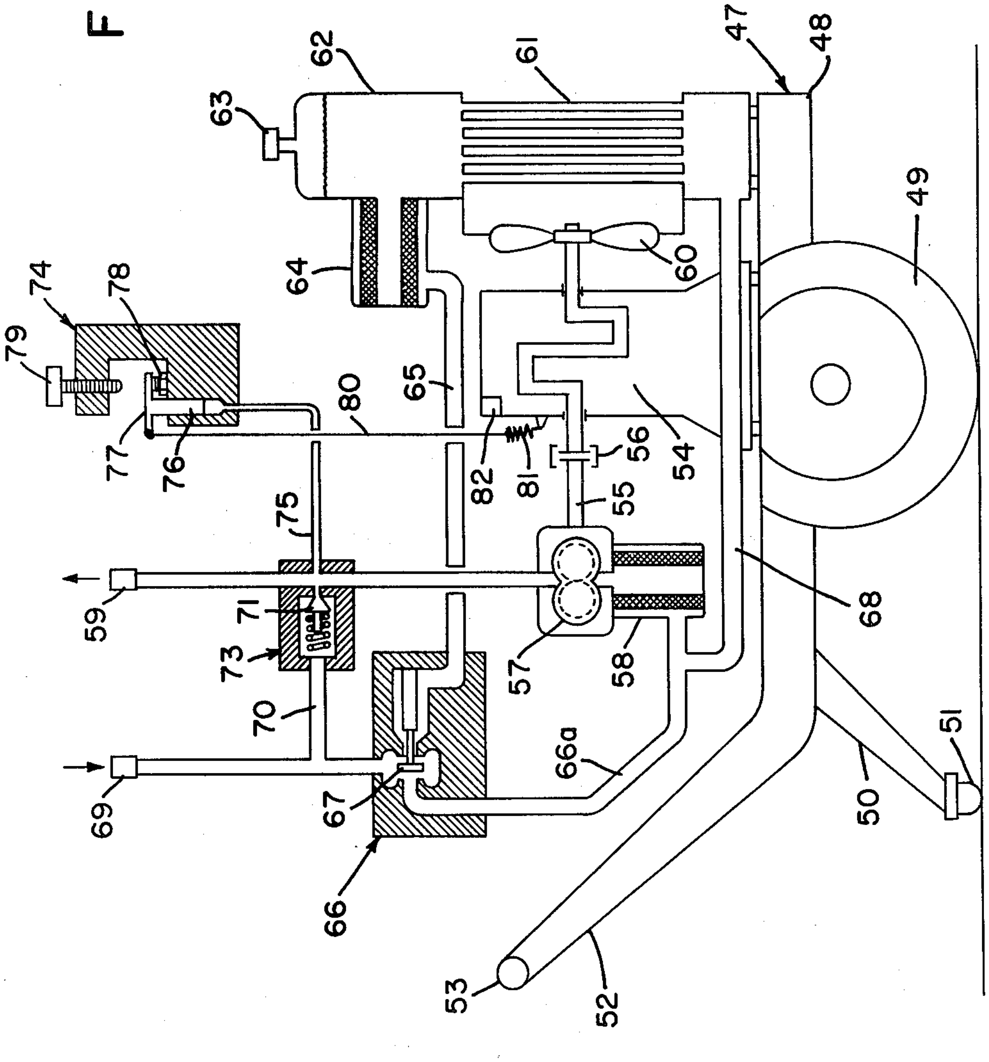
FIG. 4 is a schematic front view of a truck equipped with the drill of FIG. 1 and devices of a hydraulic circuit attached to the drill.

With reference to FIG. 4, 47 indicates a trailer, truck or platform incorporating the demolishing drill, according to the present invention, with its circuit, equipment, activation engine and fittings.

Such truck 47 has a platform 48, supporting on both sides a couple of wheels 49 equipped with tires and an arm 50 having an elastic support 51, when the machinery is not in use, and another arm 52, with an eye connector 53 for coupling the truck to a vehicle for movement.

On the platform 48 of the truck is provided a traditional internal combustion engine 54, so that the rotation of the primary transmission shaft 55, having an elastic joint 56, can provide the necessary pressure of oil, causing the operative motion of the demolishing drill.

This motion is actuated through the gear suction pump 57, having a filter 58, the whole on the delivery duct 59.

On the front of the transmission shaft 55 is mounted the fan 60 for cooling the radiator of oil 61, positioned under the tank 62 and equipped with a seal 63 and a filter 64; according to the characteristic of the invention the hydraulic circuit has a little pipe 65 connecting the tank 62 with a known thermostat 66 having a head 67. This is connected, from the lower side, to the cooler 61, through the tube 68 having a double arm 66*a* connected with the filter 58, and from the upper side to the oil return duct 69.

Another advantage is due to the fact that, between the two ducts 59 and 69, through the pipe 70, is provided the valve 73, having a core 71 and a helical cylindrical spring 72.

This valve 73, through the angular pipe 75, of a reduced diameter in comparison with the previous ones, is connected to the automatic regulator 74. Particularly, this last has a piston 76 connected through its head 77 to the minimum adjustment screw 78, while the maximum adjustment screw 79 is spaced upwardly from screw 78.

The head 77 of the piston, through the cable 80, is connected to the helical spring 81, hinged on the accelerator lever 82, this last mounted on the endothermic engine 54.

The two new devices of the circuit are actuated as follows: Once the engine 54 and the suction pump 57 are activated, the fluid flows to the drill by means of the delivery duct 59, returning to its operative cycle through the duct 69, in the tube 65 or in tube 66*a.*

In the case of an excessive oil temperature, thanks to the sensitivity of the thermostat 66, its head 67, by a traverse, closes the duct 66*a,* makes the oil to switch off the normal cycle in order to be directed, through the little tube 65, exclusively and immediately to the tank 62 and consequently to the oil cooler 61. Without a pressure, of course, the engine 54 is slow running, while on the contrary, if the drill is activated in the delivery duct 59, the pressure in the circuit is increasing.

It follows that the oil in the duct 75 lifts the piston 76, and its head 77, sliding upwardly, translates the cable 80, which in opposition to the spring 81, displaces the position of the accelerator lever 82 to the maximum running of the engine 54.

It advantageously follows that, acting on the screw 79 and, consequently, on the accelerator lever 82, the maximum running of the engine 54 is obtained, thanks to the pressure in the hydraulic circuit of delivery and it is also established the delivery of the pump 57 as well as the strike speed of the demolishing drill.

During the operative rests of the drill, as the pressure in the hydraulic circuit is unnecessary, the engine 54 runs slowly causing a reduced noise of the apparatus, an economy of the fuel for the engine and a reduction of the exhausted gases, with some ecological benefits too.

The importance of the present invention is more exactly defined by the annexed claims.

What is claimed is:

1. Hydraulic rock drill comprising:

a body having an axially extending chamber formed therein, said chamber having a plurality of axially aligned sectors including a lowermost sector, a chamber sector, an intermediate sector, and an upper sector, the diameter of said intermediate sector being greater than the diameter of said upper sector;

a bit having a core portion disposed in said lowermost sector and an operative portion protruding from the body;

a rammer disposed for reciprocating movement in said chamber and having a lower surface engageable with the core portion of the bit, a lower element carrying a piston ring, and an upper element having a groove spaced from an end surface thereof;

said piston ring being enegagable with side walls of said chamber sector to divide said chamber into an upper piston chamber and a lower piston chamber;

valve means disposed in said intermediate sector for controlling supply of hydraulic fluid to said sectors of said chamber;

an inlet duct formed in said body connectable to a source of pressurized hydraulic fluid, said inlet duct communicating with a lower portion of said intermediate sector and a lower portion of said upper sector;

an outlet duct communicating with an intermediate portion of said intermediate sector for returning fluid to the fluid source;

a first duct for communicating a lower portion of said intermediate sector with said lower piston chamber;

a second duct for communicating an intermediate portion of said intermediate sector with said upper position chamber;

a third duct for communicating an upper portion of said upper sector with an upper portion of said intermediate sector;

a fourth duct having one end communicating with said upper sector and a second end communicating with a portion of said intermediate sector spaced from the upper end of said intermediate sector, said valve means having an upper portion in sliding engagement with side walls of said intermediate sector disposed between said second end of said fourth duct and said upper end of said intermediate sector;

said valve means having first, second, and third operating modes, said valve means in the first mode directing fluid flow in such manner that the rammer remains in a lowermost position thereof, said valve means in the second mode directing fluid in such manner that the rammer is moved towards a raised position thereof, and said valve means in the third mode directing fluid flow in such manner that the rammer moves from the raised position thereof towards the lowermost position thereof.

2. A hydraulic rock drill according to claim 1, wherein said rammer is movable from its lowermost position to a partially raised position by movement of said bit into said body, such movement of said rammer switching said valve means from its first to its second operating modes.

3. A hydraulic drill, according to claim 1, further comprising an activation and regulation means for controlling the shock frequency of the rammer.

4. A hydraulic drill, according to claim 3, characterized by the fact that the valve means is a hollow cylinder having on its external surface two circular grooves and an upper circular edge for sealingly sliding in the intermediate sector of the axial chamber and said grooves providing two paths for fluid flow.

5. A hydraulic drill, according to claim 4, characterized by the fact that the valve means has, internally, a support for a helical spring, coaxially to the rammer and actuating an elastic stress between such support and the interior of the intermediate sector of the axial chamber.

6. A hydraulic drill, according to claim 5, characterized by the fact that in the sector of the axial chamber, where the piston ring is sliding, are provided two ports, respectively on opposite sides of said piston ring, from where ducts for fluid flow are directed to the intermediate sector of the axial chamber, where the valve means is located.

7. A hydraulic drill, according to claim 6 characterized by the fact that the upper sector of the axial chamber communicates with:

(a) the inlet duct of fluid from the fluid source; and (b) the intermediate sector of the axial chamber equipped with the valve means, by means of two ducts initially branched off and secondly joined together before the communication with the intermediate sector of the axial chamber, and by one duct branched off from the interior of the upper sector of the axial chamber communicating with the interior of the intermediate sector of the axial chamber.

8. A hydraulic drill, according to claim 7, characterized by the fact that the sector of the axial chamber equipped with the valve means has two ports on the cylindrical part, one for the inlet of fluid coming from the fluid source, and another for the outlet of fluid directed to a storage means, and a duct communicating with the chamber for the blow-by recovery, in which is housed a seal gasket in opposition to the lower element of the rammer.

9. A hydraulic drill, according to claim 8, characterized by the fact that the bit, axially mounted in the body of the drill, has a ring for stopping the bit against the lower surface of the body, such ring being at a level to provide when pressed against the lower surface of the body, the lifting of the rammer in order to close the port for the inlet of fluid in the upper sector of the axial chamber.

10. A hydraulic drill, according to claim 9, characterized by the fact that the regulation of the shock frequency is obtained by the activation and regulation means opening and closing a fluid by-pass circuit, the activation and regulation means having a button, with a groove, subjected to the action of a spring opposing the pressure exerted on the button by a control lever.

11. A hydraulic drill, according to claim 10, characterized by the fact that said drill is equipped with a hydraulic circuit for controlling the bit, having a thermostatic valve in the same fluid circuit, and an automatic regulator for actuating the variable running speed of an endothermic engine causing the necessary operative fluid pressure, the engine running according to the value of fluid pressure in the fluid delivery phase.

12. A hydraulic drill, according to claim 11, characterized by the fact that such automatic regulator is operative by translating the movement of a piston of a defined stroke for the minimum to the maximum running of the endothermic engine.

13. A hydraulic drill, according to claim 12, characterized by the fact that such translation of the piston is actuated by increasing the pressure of the hydraulic circuit causing the motion of a cable opposing the stress of a spring.

14. A hydraulic drill, according to claim 13, characterized by the fact that such spring is hinged on an accelerator lever for the endothermic engine.

15. A hydraulic drill, according to claim 14, characterized by the fact that said drill is equipped with two membrane accumulators.

16. A hydraulic drill according to claim 13, wherein a fan is actuated by the engine for cooling of the fluid.

17. A hydraulic drill according to claim 13, wherein the hydraulic circuit, the thermostatic valve, the automatic regulator and the engine are mounted on a means for transporting.

* * * * *